E. GRIFFIN.
PIE PAN.
APPLICATION FILED JULY 14, 1919.
1,402,065
Patented Jan. 3, 1922.
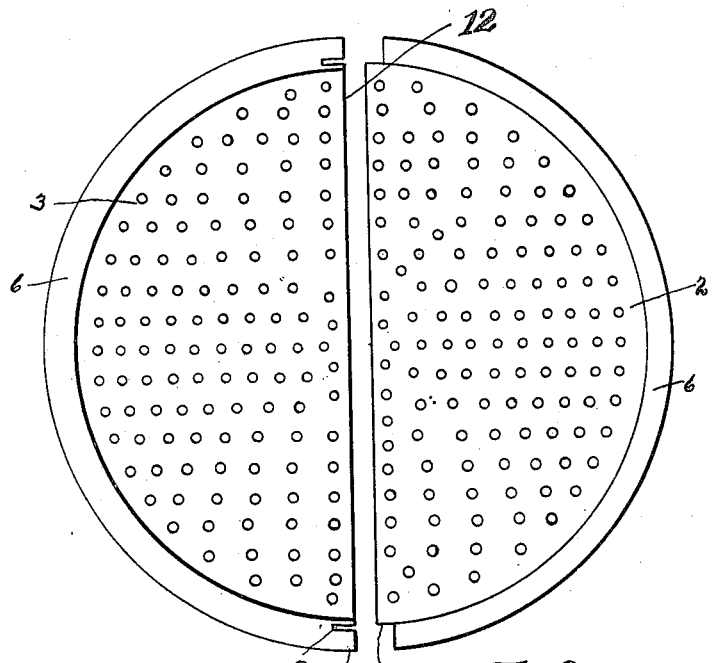
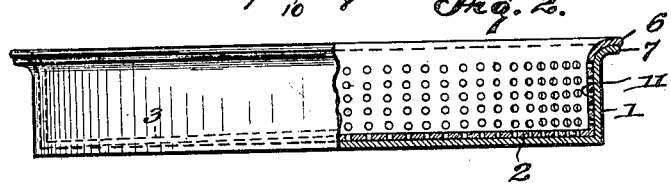
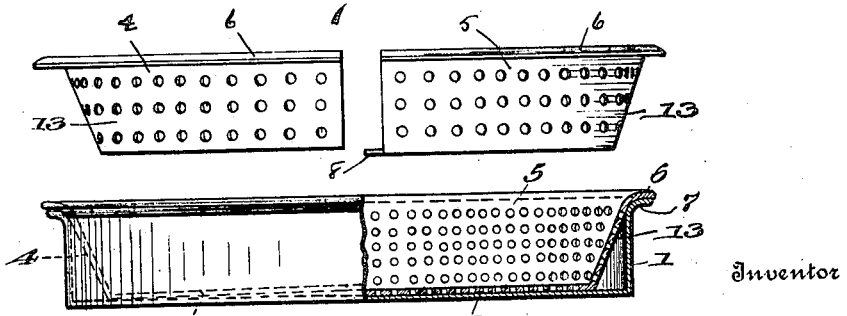
Inventor
Estella Griffin.

UNITED STATES PATENT OFFICE.

ESTELLA GRIFFIN, OF BIRMINGHAM, ALABAMA.

PIE PAN.

1,402,065.	Specification of Letters Patent.	Patented Jan. 3, 1922.

Application filed July 14, 1919. Serial No. 310,828.

*To all whom it may concern:*

Be it known that I, ESTELLA GRIFFIN, a citizen of the United States of America, residing at Birmingham, in the county of Jefferson and State of Alabama, have invented certain new and useful Improvements in Pie Pans, of which the following is a specification.

My invention relates to an improved pie pan which is distinguished by the combination of an outer imperforate pan, shaped like a cake pan, with inner sectional perforate pan, shaped like a pie pan and adapted to fit down into the outer pan, the pie pan sections being adapted for easy separation after removal from the outer pan so that the pie or pastry cooked therein can be readily slipped out without breakage.

The combination cooking utensil produced by my invention has the advantages of providing an outer cake pan which can be separately used if desired to bake cakes, and which, when used with the pie pan to bake pies, will bake the latter more successfully than the ordinary pie pan because, in my preferred form, an air space is left between the sloping marginal walls of the pie pan and the vertical marginal walls of the cake pan which will reduce the tendency of the pie crust to burn where least protected while the bottom of the pie pan, being adapted to rest on the bottom of the cake pan, will cook the relatively thick center of the pie as readily as the customary pie pan.

My invention also comprises the novel details of construction and arrangements of parts, which in their preferred embodiment only are illustrated in the accompanying drawing, in which:—

Figure 1 illustrates one form of sectional pie pan having vertical marginal walls with the sections thereof shown disconnected in position for assembling.

Fig. 2 is a partial elevation and partial vertical sectional view of the pie pan shown in Fig. 1 assembled in a typical cake pan.

Fig. 3 shows in side elevation my preferred type of pie pan having sloping marginal walls, its sections being shown separated ready for assembling.

Fig. 4 is a view corresponding to Fig. 2 with my preferred type of pie pan in operating position in the cake pan.

Similar reference numerals refer to similar parts throughout the drawings.

My invention contemplates the use with a typical cake pan having substantially vertical marginal side walls 11 of a sectional perforated pie pan adapted to be assembled and set down into the cake pan.

The pie pan, as illustrated in Figs. 1 and 2, comprises two half sections 2 and 3, each having a perforate bottom and a perforated substantially vertical marginal wall 11. The upper edge of the marginal walls 11 is shaped to form an outturned flange 6 adapted to overlap and rest on a corresponding flange 7 about the top edge of the cake pan wall 1. The pie pan section 2 is provided with a bottom extension 8 which projects beyond the ends of its marginal wall 11 and is adapted to underlie the straight diametric edge 12 of the other pie pan section 3. The flange 6 of the pan section 3 at each end is provided with a notch 9 which leaves an outer tongue 10 which is slightly upset so that the meeting ends of the flange 6 on the pan section 2 will pass into the slot and under the tongue 10, thus causing the pie pan sections to be interlocked as assembled by the engagement of the bottom extension 8 under the bottom of the opposite pie pan section and the interlocking of the flange 6 of the section 2 in the notch 9 and under the tongue 10 of the section 3. This manner of interlocking does not interfere with the separation of the sections when they are free to be moved laterally apart, but when they are held in position against lateral displacement, as when set in the cake pan, the pie pan sections are held effectively assembled and interlocked.

By reference to Fig. 2, it will be noted that the pie pan conforms to the inside shape of the cake pan, the height of the marginal walls 11 being such that when the flange 6 rests on the cake pan flange 7 the bottoms of sections 2 and 3 of the pie pan will rest on the bottom of the cake pan.

In Fig. 3 I show my preferred type of pie pan which consists of the sections 4 and 5 corresponding in all particulars to the sections 3 and 2, respectively, except that the marginal wall 13 of the pie pan sections 4 and 5 slopes upwardly and sharply outwardly to its flange 6. The sections 4 and 5 are adapted to be interlocked in the same manner as the sections 3 and 2 and this pie pan is intended to be used in the cake pan with the vertical marginal wall 1, the depth of the pie pan being such that when its flange 6 rests on the cake pan flange 7, the bottom of the pie pan will rest on the bottom of the cake pan and there will be a circumferential air space between the sloping marginal pie pan wall 13 and the vertical marginal cake pan wall 1, this air space causing the thinner edge portions of the pie to cook more slowly than the relatively thicker center portion of the pie, which however will cook as rapidly and effectively as where a single unperforated pie pan is used as in the present general practice. When the pie has been baked, the flange 6 at the joints of the pie pan sections can be grasped and the pie pan and pie lifted out of the cake pan and placed on a dish, whereupon the pie pan sections can be drawn apart and slipped from under the pie leaving it in perfect unbroken condition on the plate. The perforations in the pie pan are provided to permit the heat to get through to the pie while the unperforated cake pan will catch and hold any loose filling that may escape from the pie pastry.

Having thus described my invention, what I claim as new and desire to secure by Letters Patent, is:—

1. A cooking appliance comprising an outer unperforated cake pan having a substantially vertical marginal wall, and an inner sectional perforated pie pan having a sloping marginal wall and adapted to interfit in the cake pan, as and for the purposes described.

2. A cooking appliance in accordance with claim 1, in which the pie pan is formed in two half sections having means at their meeting edges to interlock, and having its bottom adapted to rest on the cake pan bottom and its marginal wall spaced, except about its top edge, from the marginal cake pan wall.

3. The combination with an imperforate cake pan, of a perforated sectional pie pan adapted to fit into the cake pan, said pans having engaging marginal top flanges and the inner perforate pan having a depth sufficient to cause its bottom to rest on the bottom of the cake pan.

4. In combination, an imperforate cake pan, a sectional perforate pie pan, the pie pan having a marginal wall which slopes more than the marginal wall of the cake pan and projects above the latter marginal wall, and members on the exposed top edge of the pie pan marginal wall which interlock and which can be grasped to lift the pie pan out of the cake pan.

In testimony whereof I affix my signature.

ESTELLA GRIFFIN.

Witness:
NOMIE WELSH.